United States Patent
Zhang et al.

(10) Patent No.: US 10,820,302 B2
(45) Date of Patent: *Oct. 27, 2020

(54) RESOURCE REUSE APPARATUS, USER EQUIPMENT, AND RESOURCE REUSE METHOD

(71) Applicant: HUAWEI TECHNOLOGIES CO., LTD., Shenzhen, Guangdong (CN)

(72) Inventors: Xingwei Zhang, Beijing (CN); Chao Li, Beijing (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

This patent is subject to a terminal disclaimer.

(21) Appl. No.: 16/127,846

(22) Filed: Sep. 11, 2018

(65) Prior Publication Data

US 2019/0029004 A1 Jan. 24, 2019

Related U.S. Application Data

(63) Continuation of application No. 15/338,963, filed on Oct. 31, 2016, now Pat. No. 10,091,768, which is a
(Continued)

(51) Int. Cl.
*H04W 72/04* (2009.01)
*H04W 74/08* (2009.01)
(Continued)

(52) U.S. Cl.
CPC ............ *H04W 72/04* (2013.01); *H04W 4/70* (2018.02); *H04W 74/0825* (2013.01); *H04W 76/14* (2018.02)

(58) Field of Classification Search
None
See application file for complete search history.

(56) References Cited

U.S. PATENT DOCUMENTS

| 6,711,344 B1* | 3/2004 | Ito .................... G11B 27/005 |
| | | 348/E5.008 |
| 2002/0024936 A1* | 2/2002 | Yamamoto .............. H04L 41/00 |
| | | 370/252 |

(Continued)

FOREIGN PATENT DOCUMENTS

| CN | 103024911 A | 4/2013 |
| CN | 103229582 A | 7/2013 |

(Continued)

OTHER PUBLICATIONS

Choi, J. et al., *EBA: An Enhancement of the IEEE 802.11 DCF via Distributed Reservation*, IEEE Transactions on Mobile Computing, vol. 4, No. 4, Jul./Aug. 2005, pp. 378-390.

(Continued)

*Primary Examiner* — Duc T Duong
(74) *Attorney, Agent, or Firm* — Fish & Richardson P.C.

(57) ABSTRACT

A resource reuse apparatus, user equipment, and a resource reuse method are disclosed. The method includes: monitoring, by first user equipment, idle resources so as to obtain a first idle resource set; claiming, in a first cycle, to use a first resource, where the first resource is a resource in the first idle resource set; determining whether the first resource exists in a first claimed resource set, where the first claimed resource set is a set of resources that are claimed to be used by another user equipment except the first user equipment; and if the first resource exists in the first claimed resource set, claiming, in a second cycle, to use a second resource, where the second resource is a resource, in the first idle resource set, that is different from the first resource; or reclaiming a resource after at least one cycle following the first cycle.

15 Claims, 7 Drawing Sheets

Related U.S. Application Data continuation of application No. PCT/CN2014/076451, filed on Apr. 29, 2014.

(51) Int. Cl.
*H04W 76/14* (2018.01)
*H04W 4/70* (2018.01)

(56) References Cited

U.S. PATENT DOCUMENTS

| | | | |
|---|---|---|---|
| 2008/0298390 A1* | 12/2008 | Kneckt | H04L 47/724 370/468 |
| 2009/0016295 A1* | 1/2009 | Li | H04L 5/0044 370/330 |
| 2009/0016305 A1* | 1/2009 | Lee | H04W 72/0426 370/336 |
| 2009/0310554 A1* | 12/2009 | Sun | H04W 16/10 370/329 |
| 2010/0226342 A1* | 9/2010 | Colling | H04W 56/002 370/336 |
| 2012/0147745 A1 | 6/2012 | Wang et al. | |
| 2012/0281637 A1* | 11/2012 | Junell | H04W 28/16 370/329 |
| 2013/0150061 A1 | 6/2013 | Shin et al. | |
| 2013/0308549 A1 | 11/2013 | Madan et al. | |
| 2014/0153417 A1 | 6/2014 | Gupta | |
| 2015/0245334 A1 | 8/2015 | Chang | |
| 2015/0304973 A1* | 10/2015 | Ye | H04W 56/0015 370/350 |
| 2016/0338127 A1 | 11/2016 | Matsumoto et al. | |
| 2017/0019914 A1 | 1/2017 | Rune et al. | |
| 2017/0034863 A1 | 2/2017 | Zhang | |
| 2017/0048827 A1 | 2/2017 | Zhang et al. | |
| 2017/0099599 A1 | 4/2017 | Ko et al. | |

FOREIGN PATENT DOCUMENTS

| | | |
|---|---|---|
| CN | 103338497 A | 10/2013 |
| JP | 6483727 B2 | 3/2019 |
| KR | 10-2014-0009930 A | 1/2014 |

OTHER PUBLICATIONS

Huawei et al., *Distributed resource allocation from mode-2*, 3GPP TSG RAN WG1 Meeting #77 Seoul, Korea, May 19-23, 2014, R1-141929 (4 pp.).

*Multiplexing of Uu and D2D discovery signal*, 3GPP TSG RAN WG1 Meeting #76, R1-140338, Prague, Czech Republic, Feb. 10-14, 2014, pp. 1-4.

*Operation in Mode 2 resource allocation for D2D communication*, 3GPP TSG RAN WG1 Meeting #76bis, R1-141350, Shenzen, China, Mar. 31-Apr. 4, 2014, pp. 1-8.

*Distributed Resource Allocation for D2D Communication*, 3GPP TSG-RAN WG1 Meeting #76bis, R1-141425, Shenzhen, China, Mar. 31-Apr. 4, 2014 (6 pp.).

Office Action, dated Aug. 3, 2018, in Chinese Application No. 201480001632.8 (8 pp.).

Office Action, dated Feb. 20, 2018, in Japanese Application No. 2016-565300 (6 pp.).

International Search Report, dated Feb. 6, 2015, in International Application No. PCT/CN2014/076451 (8 pp.).

Extended European Search report, dated Apr. 5, 2017, in European Application No. 14890510.2 (8 pp.).

Notice of Allowance, dated May 25, 2018, in U.S. Appl. No. 15/338,963 (22 pp.).

U.S. Appl. No. 15/338,963, filed Oct. 31, 2016, Zhang et al., Huawei Technologies Co., Ltd.

3GPP TS 36.213 V12.1.0 (Mar. 2014), "3rd Generation Partnership Project; Technical Specification Group Radio Access Network; Evolved Universal Terrestrial Radio Access (E-UTRA); Physical layer procedures(Release 12)," pp. 1-186.

3GPP TS 36.321 V12.1.0 (Mar. 2014), 3rd Generation Partnership Project; Technical Specification Group Radio Access Network; Evolved Universal Terrestrial Radio Access (E-UTRA); Medium Access Control (MAC) protocol specification (Release 12), pp. 1-57.

3GPP TS 36.212 V12.0.0 (Dec. 2013), 3rd Generation Partnership Project; Technical Specification Group Radio Access Network; Evolved Universal Terrestrial Radio Access (E-UTRA); Multiplexing and channel coding (Release 12), pp. 1-88.

Huawei, HiSilicon, "Procedures for Type 1 and Type 2 Discovery Resource Allocation." 3GPP TSG RAN WG2 Meeting #85bis Valencia, Spain, Mar. 31-Apr. 4, 2014, R2-141436, 9 pages.

ZTE, "Considerations on D2D Proximity Discovery." 3GPP TSG-RAN WG2 Meeting #83 Barcelona, Spain, Aug. 19-23, 2013, R2-132680, 5 pages.

Notice of Allowance dated Feb. 26, 2019 in corresponding Korean Patent Application No. 10-2016-7033099 (2 pages).

Office Action issued in Japanese Application No. 2019-024496 dated May 19, 2020, 6 pages (with English translation).

* cited by examiner

RESOURCE REUSE APPARATUS, USER EQUIPMENT, AND RESOURCE REUSE METHOD

CROSS-REFERENCE TO RELATED APPLICATIONS

This application is a continuation of U.S. patent application Ser. No. 15/338,963, filed on Oct. 31, 2016, which is a continuation of International Application No. PCT/CN2014/076451, filed on Apr. 29, 2014. All of the afore-mentioned patent applications are hereby incorporated by reference in their entireties.

TECHNICAL FIELD

The present disclosure relates to the field of communications technologies, and in particular, to a resource reuse apparatus, user equipment, and a resource reuse method.

BACKGROUND

3rd Generation Partnership Project ("3GPP" for short) Long Term Evolution-Advanced ("LTE-A" for short) is an enhancement of Long Term Evolution ("LTE" for short). An LTE-A system has a higher requirement on bandwidth than an LTE system, and supports a downlink peak data rate of 1 Gbit/s and an uplink peak data rate of 500 Mbit/s. To meet a requirement of LTE-A, the LTE-A system uses multiple technologies to improve the data rate. However, as wireless communications rapidly develops and an ultra-high rate service (for example, a high-definition video) emerges, a load on a wireless communications network becomes increasingly heavy. To better reduce the load on the network, a device to device ("D2D" for short) communications emerges. In this communication mode, terminals may directly communicate with each other without forwarding through an evolved NodeB, thereby offloading the evolved NodeB. With D2D communications, a spectrum resource can be better utilized, so as to improve spectrum utilization and the data rate, thereby reducing a load on the evolved NodeB.

In the prior art, a specific process in which user equipment ("UE" for short) obtains a resource is as follows: The UE monitors an available resource in a predefined cycle; if an idle resource is detected, the UE may select a resource and claim to use the resource in a currently claimed channel, and uses the resource to send data in a next cycle.

In a process of implementing the present invention, the inventor finds that the prior art has the following disadvantages:

In a predefined cycle, multiple UEs may claim a resource at the same time; when a resource claimed by another UE is the same as the resource claimed by the UE (a case in which different UEs claim a same resource), a conflict of the claimed resource occurs, which causes a relatively high delay of obtaining the available resource by the UE. Particularly, when there are a large quantity of UE and fewer idle resources, and a conflict probability is extremely high; in this case, the UE needs to claim multiple times so as to obtain the available resource, and therefore the delay of obtaining the resource by a user is higher.

SUMMARY

To resolve a problem in the prior art that, in a D2D communication mode, when a UE reuses a resource, a conflict probability is relatively high, and a delay of obtaining a resource by the UE is relatively high, embodiments of the present invention provide a resource reuse apparatus, user equipment, and a resource reuse method. Technical solutions are as follows:

According to a first aspect, an embodiment of the present invention provides a resource reuse apparatus, disposed in first user equipment, where the apparatus includes:

a monitoring module, configured to monitor idle resources so as to obtain a first idle resource set;

a claiming module, configured to claim, in a first cycle, to use a first resource, where the first resource is a resource in the first idle resource set that is obtained by the monitoring module;

a judging module, configured to determine whether the first resource exists in a first claimed resource set, where the first claimed resource set is a set of resources that are claimed to be used by another user equipment except the first user equipment; and a sending module, configured to: when the first resource does not exist in the first claimed resource set, use, in the second cycle, the first resource to send data; where the claiming module is further configured to: when the first resource exists in the first claimed resource set, claim, in the second cycle, to use a second resource, where the second resource is a resource, in the first idle resource set, that is different from the first resource, and the second cycle is a cycle following the first cycle; or reclaim a resource after at least one cycle following the first cycle.

In a first possible implementation manner of the present invention, the apparatus further includes:

a determining module, configured to: before the judging module determines whether the first resource exists in the first claimed resource set, determine resources that are claimed, in the first cycle, to be used by another user equipment except the first user equipment, so as to obtain the first claimed resource set.

In a second possible implementation manner of the present invention, the claiming module is configured to: when the first resource exists in the first claimed resource set, select the second resource from the first idle resource set according to the first idle resource set and the first claimed resource set; and claim, in the second cycle, to use the second resource.

Optionally, the claiming module includes:

a first claiming unit, configured to select a resource from A−(A∩B) as the second resource, where A indicates the first idle resource set, and B indicates the first claimed resource set.

Optionally, the claiming module includes:

a first statistics collection unit, configured to collect, in the first claimed resource set, statistics about claim information of each resource, where the claim information includes one or more of: a quantity of claim times of each resource, a quantity of claiming user equipment of each resource, or a signal power of the claiming user equipment of each resource, or interference of the claiming user equipment of each resource; and a second claiming unit, configured to select the second resource from the first idle resource set according to the claim information of each resource that is collected by the first statistics collection unit.

Further, the second claiming unit is configured to:

select, from the first idle resource set, a resource with the smallest quantity of claim times as the second resource, or use a resource that is in the first idle resource set and that is corresponding to the smallest quantity of the user equipment as the second resource; or use a resource with the lowest signal power in the first idle resource set as the second resource; or use a resource with the weakest signal interference in the first idle resource set as the second resource.

In a third possible implementation manner of the present invention, the claiming module includes:

a second statistics collection unit, configured to collect, in the first claimed resource set, statistics about a quantity C of user equipment that claims the first resource, and generate a random number r in a range of [1,C]; and a third claiming unit, configured to reclaim a resource after r cycles following the first cycle.

In a fourth possible implementation manner of the present invention, the claiming module includes:

a fourth claiming unit, configured to: after at least one cycle following the first cycle, select a third resource from the first idle resource set, and claim to use the third resource; or a fifth claiming unit, configured to: after an interval of at least one cycle following the first cycle, select a third resource from a second idle resource set, and claim to use the third resource, where the second idle resource set is an idle resource set that is obtained by the monitoring module by re-monitoring idle resources after the at least one cycle following the first cycle.

In a fifth possible implementation manner of the present invention, the claiming module is further configured to:

before the claiming, in a first cycle, to use a first resource, select a resource from A−(A∩B) as the first resource, where A indicates the first idle resource set, and B indicates the first claimed resource set; or before the claiming, in a first cycle, to use a first resource, randomly select a resource from the first idle resource set as the first resource; or before the claiming, in a first cycle, to use a first resource, select the first resource from the first idle resource set according to the claim information of each resource in the first claimed resource set, where the claim information includes the one or more of: a quantity of claim times of each resource, a quantity of claiming user equipment of each resource, or a signal power of the claiming user equipment of each resource, or interference of the claiming user equipment of each resource.

According to a second aspect, an embodiment of the present invention provides user equipment, where the user equipment includes: a transmitter, a memory, and a processor; where:

the transmitter is configured to send data;

the memory is configured to store an instruction and data; and the processor is configured to invoke a program code that is stored in the memory, so as to execute the following operations:

monitoring idle resources so as to obtain a first idle resource set;

claiming, in a first cycle, to use a first resource, where the first resource is a resource in the first idle resource set;

determining whether the first resource exists in a first claimed resource set, where the first claimed resource set is a set of resources that are claimed to be used by another user equipment except the first user equipment; and if the first resource exists in the first claimed resource set, claiming, in a second cycle, to use a second resource, where the second resource is a resource, in the first idle resource set, that is different from the first resource, and the second cycle is a cycle following the first cycle; or reclaiming a resource after at least one cycle following the first cycle; or if the first resource does not exist in the first claimed resource set, using, in a second cycle, the first resource to send data.

According to a third aspect, an embodiment of the present invention further provides a resource reuse method, where the method includes:

monitoring, by first user equipment, idle resources so as to obtain a first idle resource set;

claiming, in a first cycle, to use a first resource, where the first resource is a resource in the first idle resource set;

determining whether the first resource exists in a first claimed resource set, where the first claimed resource set is a set of resources that are claimed to be used by another user equipment except the first user equipment; and if the first resource exists in the first claimed resource set, claiming, in a second cycle, to use a second resource, where the second resource is a resource, in the first idle resource set, that is different from the first resource, and the second cycle is a cycle following the first cycle; or reclaiming a resource after at least one cycle following the first cycle; or if the first resource does not exist in the first claimed resource set, using, in a second cycle, the first resource to send data.

In a first possible implementation manner of the present invention, before the determining whether the first resource exists in the first claimed resource set, the method further includes:

determining the resources that are claimed, in the first cycle, to be used by the another user equipment except the first user equipment, so as to obtain the first claimed resource set.

In a second possible implementation manner of the present invention, if the first resource exists in the first claimed resource set, the claiming, in a second cycle, to use a second resource includes:

if the first resource exists in the first claimed resource set, selecting the second resource from the first idle resource set according to the first idle resource set and the first claimed resource set, and claiming, in the second cycle, to use the second resource.

Optionally, the selecting the second resource from the first idle resource set according to the first idle resource set and the first claimed resource set includes:

selecting a resource from A−(A∩B) as the second resource, where A indicates the first idle resource set, and B indicates the first claimed resource set.

Optionally, the selecting the second resource from the first idle resource set according to the first idle resource set and the first claimed resource set includes:

collecting statistics about claim information of each resource in the first claimed resource set, where the claim information includes one or more of: a quantity of claim times of each resource, a quantity of claiming user equipment of each resource, or a signal power of the claiming user equipment of each resource, or interference of the claiming user equipment of each resource; and selecting the second resource from the first idle resource set according to the claim information of each resource.

Further, the selecting the second resource from the first idle resource set according to the claim information of each resource includes:

selecting, from the first idle resource set, a resource with the smallest quantity of claim times as the second resource; or using a resource that is in the first idle resource set and that is corresponding to the smallest quantity of the user equipment as the second resource; or using a resource with the lowest signal power in the first idle resource set as the second resource; or using a resource with the weakest signal interference in the first idle resource set as the second resource.

In a third possible implementation manner of the present invention, the reclaiming a resource after at least one cycle following the first cycle includes:

collecting, in the first claimed resource set, statistics about a quantity C of user equipment that claims the first resource; and generating a random number r in a range of [1,C], and after an interval of r cycles following the first cycle, reclaiming a resource.

In a fourth possible implementation manner of the present invention, the reclaiming a resource includes:

selecting a third resource from the first idle resource set, and claiming to use the third resource; or the reclaiming a resource includes:

re-monitoring idle resources so as to obtain a second idle resource set; and selecting a third resource from the second idle resource set, and claiming to use the third resource.

In a fifth possible implementation manner of the present invention, before the claiming, in a first cycle, to use a first resource, the method further includes:

selecting a resource from A−(A∩B) as the first resource, where A indicates the first idle resource set, and B indicates the first claimed resource set; or randomly selecting a resource from the first idle resource set as the first resource; or selecting the first resource from the first idle resource set according to the claim information of each resource in the first claimed resource set, where the claim information includes the one or more of: a quantity of claim times of each resource, a quantity of claiming user equipment of each resource, or a signal power of the claiming user equipment of each resource, or interference of the claiming user equipment of each resource.

The technical solutions provided in the embodiments of the present invention may include the following beneficial effects: A relationship between idle resources (a first idle resource set) that are detected by a UE and idle resources (a first claimed resource set) that are claimed by another device; when a resource that is claimed by first user equipment conflicts with a resource that is claimed by another UE, another resource is selected from the first idle resource set (an idle resource set that is detected by the first user equipment) for claiming, the first user equipment selects another resource for claiming, or reclaims a resource after an interval of at least one cycle is performed. In this way, a conflict backoff is performed, which reduces a probability of a conflict between UEs when a UE obtains a resource and a delay of obtaining a resource by the UE, and enhances system resource utilization.

It should be understood that the foregoing general description and the following detailed description are merely exemplary, and impose no limitation on this disclosure.

BRIEF DESCRIPTION OF DRAWINGS

To describe the technical solutions in the embodiments of the present invention more clearly, the following briefly describes the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

Figure 1:
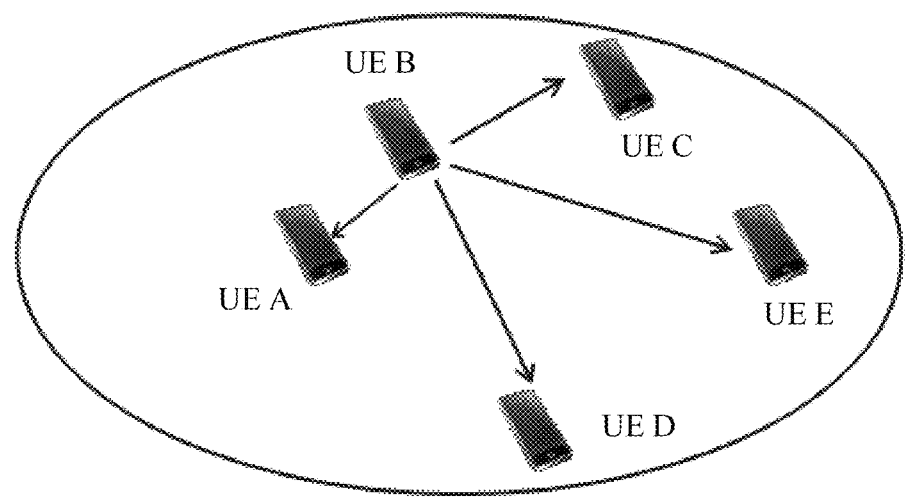
FIG. 1 is a diagram of an application scenario of a resource reuse apparatus, user equipment, and a resource reuse method according to an embodiment of the present invention.

The following first describes an application scenario of an embodiment of the present invention with reference to FIG. 1. As shown in FIG. 1, multiple D2D devices (UE A, UE B, UE C, UE D and UE E shown in the figure) contend for a resource from a resource pool. In a scenario with network coverage, the resource pool may be a whole block of resources that is separated from an evolved NodeB ("eNB" for short), and all the D2D devices contend for a small block of resources in the whole block of resources. The whole block of resources may be obtained by reusing an uplink spectrum resource or a downlink spectrum resource in a communications network. However, to avoid interference to a terminal of an existing network, a D2D communication link generally reuses the uplink spectrum resource. The uplink spectrum resource means a link from a UE to the evolved NodeB, and UEs contend for the uplink spectrum resource. In a scenario without network coverage, the resource pool may be a block of predefined system bandwidth that can be obtained by the D2D device, and all the D2D devices contend for a resource under predefined resources.

Embodiment 1

Figure 2:
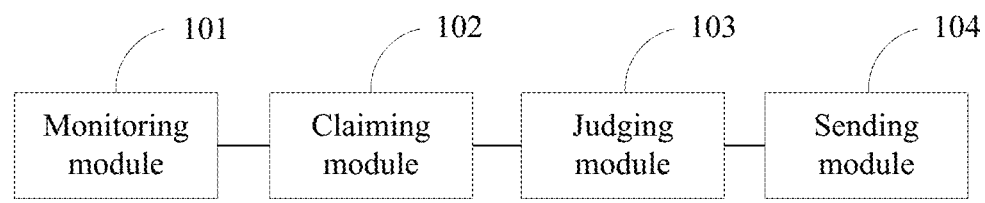
FIG. 2 is a schematic structural diagram of a resource reuse apparatus according to Embodiment 1 of the present invention.

An embodiment provides a resource reuse apparatus, where the apparatus is disposed in first user equipment, and the first user equipment may be a D2D device. As shown in FIG. 2, the apparatus includes:

a monitoring module 101, configured to monitor idle resources so as to obtain a first idle resource set;

a claiming module 102, configured to claim, in a first cycle, to use a first resource, where the first resource is a resource in the first idle resource set that is obtained by the monitoring module 101;

a judging module 103, configured to determine whether the first resource exists in a first claimed resource set, where the first claimed resource set is a set of resources that are claimed to be used by another user equipment except the first user equipment; and a sending module 104, configured to: when the first resource does not exist in the first claimed resource set, use, in a second cycle, the first resource to send data; where the claiming module 102 is further configured to: when the first resource exists in the first claimed resource set, claim, in the second cycle, to use a second resource, where the second resource is a resource, in the first idle resource set, that is different from the first resource, and the second cycle is a cycle following the first cycle; or reclaim a resource after at least one cycle following the first cycle.

In this embodiment of the present invention, a relationship between idle resources (a first idle resource set) that are detected by a UE and idle resources (a first claimed resource set) that are claimed by another device is determined. When a resource that is claimed by first user equipment conflicts with a resource that is claimed by another UE, a selection of a to-be-claimed resource is performed according to the first idle resource set (an idle resource set that is detected by the first user equipment) and the first claimed resource set (resources that are claimed, in a first cycle, to be used by another user equipment except the first user equipment), which reduces a probability of a conflict between UEs when a UE obtains a resource and a delay of obtaining a resource by the UE, and enhances system resource utilization.

Embodiment 2

Figure 3:
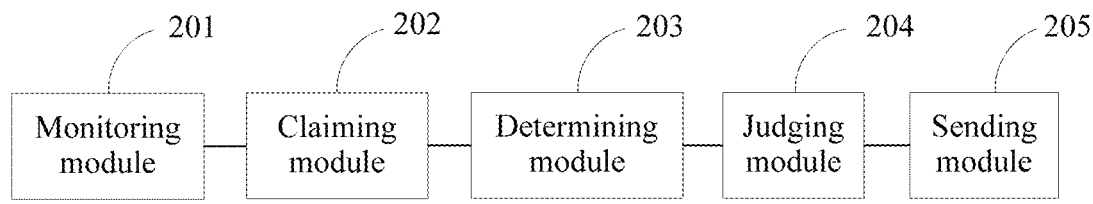
FIG. 3 is a schematic structural diagram of a resource reuse apparatus according to Embodiment 2 of the present invention.

An embodiment provides a resource reuse apparatus, where the apparatus is disposed in first user equipment, and the first user equipment may be a D2D device. As shown in FIG. 3, the apparatus includes:

a monitoring module 201, configured to monitor idle resources so as to obtain a first idle resource set;

a claiming module 202, configured to claim, in a first cycle, to use a first resource, where the first resource is a resource, in the first idle resource set, that is obtained by the monitoring module 201;

a judging module 204, configured to determine whether the first resource exists in a first claimed resource set, where the first claimed resource set is a set of resources that are claimed to be used by another user equipment except the first user equipment; and a sending module 205, configured to: when the first resource does not exist in the first claimed resource set, use, in a second cycle, the first resource to send data; where the claiming module 202 is further configured to: when the first resource exists in the first claimed resource set, claim, in the second cycle, to use a second resource, where the second resource is a resource, in the first idle resource set, that is different from the first resource, and the second cycle is a cycle following the first cycle; or reclaim a resource after an interval of at least one cycle following the first cycle.

In an implementation manner of this embodiment, the apparatus may further include:

a determining module 203, configured to determine the resources that are claimed, in the first cycle, to be used by the another user equipment except the first user equipment, so as to obtain the first claimed resource set.

In another implementation manner of this embodiment, the claiming module 202 may be configured to: when the first resource exists in the first claimed resource set, select the second resource from the first idle resource set according to the first idle resource set and the first claimed resource set, and claim, in the second cycle, to use the second resource.

Figure 3A:
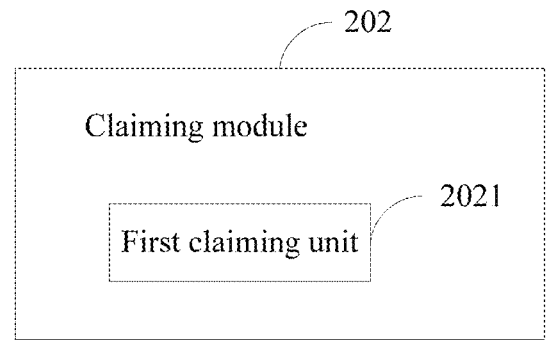
FIG. 3a is a schematic structural diagram of a claiming module according to Embodiment 2 of the present invention.

Optionally, as shown in FIG. 3a, the claiming module 202 may include:

a first claiming unit 2021, configured to select a resource from A−(A∩B) as the second resource, where A indicates the first idle resource set, and B indicates the first claimed resource set.

Figure 3B:
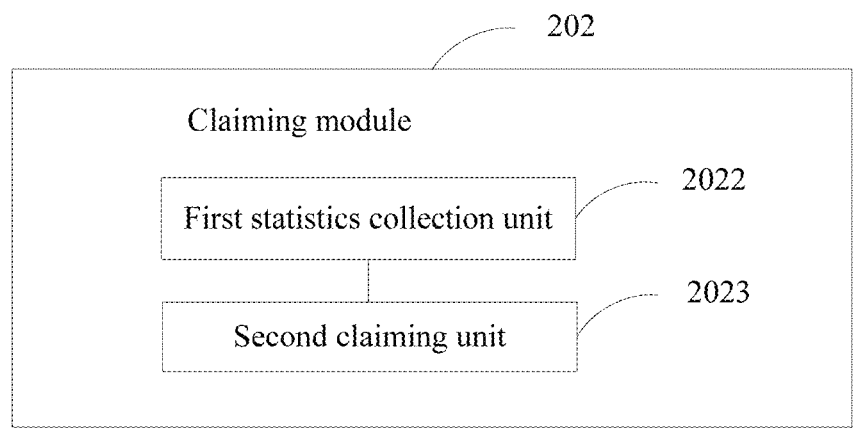
FIG. 3b is a schematic structural diagram of another claiming module according to Embodiment 2 of the present invention.
Figure 3C:
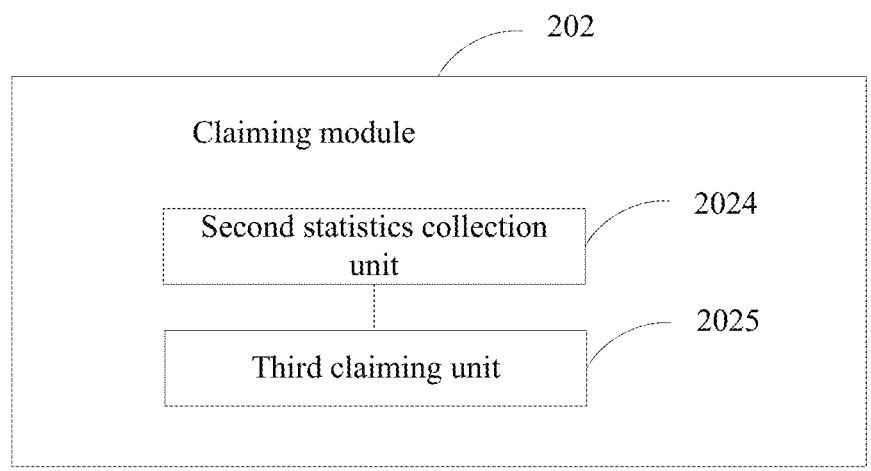
FIG. 3c is a schematic structural diagram of still another claiming module according to Embodiment 2 of the present invention.

Optionally, as shown in FIG. 3b, the claiming module 202 may include:

a first statistics collection unit 2022, configured to collect, in the first claimed resource set, statistics about claim information of each resource, where the claim information includes one or more of: a quantity of claim times of each resource, a quantity of claiming user equipment of each resource, or a signal power of the claiming user equipment of each resource, or interference of the claiming user equipment of each resource; and a second claiming unit 2023, configured to select the second resource from the first idle resource set according to the claim information of each resource that is collected by the first statistics collection unit 2022.

Further, the second claiming unit 2022 may be configured to:

select, from the first idle resource set, a resource with the smallest quantity of claim times as the second resource; or use a resource that is in the first idle resource set and that is corresponding to the smallest quantity of the user equipment as the second resource; or use a resource with the lowest signal power in the first idle resource set as the second resource; or use a resource with the weakest signal interference in the first idle resource set as the second resource.

It can be easily learned that, in another embodiment, the claiming module 202 may be configured to: when the first resource exists in the first claimed resource set, directly select the second resource from the first idle resource set, and claim, in the second cycle, to use the second resource, where the second resource is a resource that is different from the first resource.

In still another implementation manner of this embodiment, as shown in 3c, the claiming module 202 may include:

a second statistics collection unit 2024, configured to collect, in the first claimed resource set, statistics about a quantity C of user equipment that claims the first resource, and generate a random number r in a range of [1,C]; and a third claiming unit 2025, configured to reclaim a resource after r cycles following the first cycle.

It can be easily learned that a manner for reclaiming a resource by the third claiming unit 2025 may include:

selecting a third resource from the first idle resource set, and claiming to use the third resource; or selecting a third resource from a second idle resource set, and claiming to use the third resource, where the second idle resource set is an idle resource set that is obtained by the monitoring module by re-monitoring idle resources after r cycles following the first cycle.

In still another implementation manner of this embodiment, the claiming module 202 may include:

a fourth claiming unit, configured to: after at least one cycle following the first cycle, select a third resource from the first idle resource set, and claim to use the third resource; or a fifth claiming unit, configured to: after at least one cycle following the first cycle, select a third resource from a second idle resource set, and claim to use the third resource, where the second idle resource set is an idle resource set that is obtained by the monitoring module by re-monitoring idle resources after the at least one cycle following the first cycle.

In still another implementation manner of this embodiment, the claiming module 202 may be further configured to:

before the claiming, in a first cycle, to use a first resource, select a resource from A−(A∩B) as the first resource, where A indicates the first idle resource set, and B indicates a first claimed resource set; or before the claiming, in a first cycle, to use a first resource, randomly select a resource from the first idle resource set as the first resource; or before the claiming, in a first cycle, to use a first resource, select the first resource from the first idle resource set according to the claim information of each resource in the first claimed resource set, where the claim information includes the one or more of: a quantity of claim times of each resource, a quantity of claiming user equipment of each resource, or a signal power of the claiming user equipment of each resource, or interference of the claiming user equipment of each resource.

In this embodiment of the present invention, a relationship between idle resources (a first idle resource set) that are detected by a UE and idle resources (a first claimed resource set) that are claimed by another device is determined. When a resource that is claimed by first user equipment conflicts with a resource that is claimed by another UE, according to the first idle resource set (an idle resource set that is detected by the first user equipment) and the first claimed resource set (resources that are claimed, in a first cycle, to be used by another user equipment except the first user equipment), the first user equipment selects, after at least one cycle at random, to participate in resource contention again. In this way, a conflict backoff is performed on a claimed resource, which reduces a probability of a conflict between UEs when a UE obtains a resource and a delay of obtaining a resource by the UE, and enhances system resource utilization.

Embodiment 3

Figure 4:
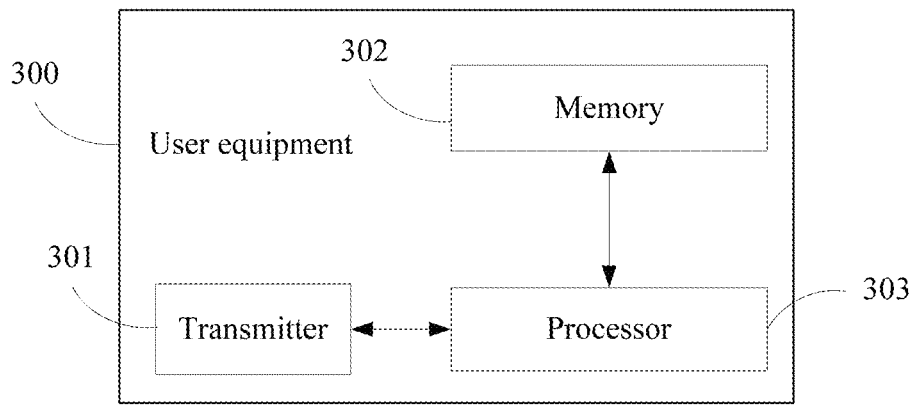
FIG. 4 is a schematic structural diagram of user equipment according to Embodiment 3 of the present invention.

An embodiment of the present invention further provides user equipment. As shown in FIG. 4, user equipment 300 includes: a transmitter 301, a memory 302, and a processor 303. A person skilled in the art may understand that a structure shown in FIG. 4 imposes no limitation on the equipment, and the equipment may include more or fewer parts than those shown in FIG. 4, or combine some parts, or have different parts arrangement.

The transmitter 301 is configured to send data. The memory 302 is configured to store an instruction and data.

The following describes the constituent parts of the user equipment 300 in detail with reference to FIG. 4:

The memory 302 may be configured to store a software program and an application module. By running the software program and the application module that are stored in the memory 302, the processor 303 executes various functions and applications of the user equipment 300 and performs data processing. The memory 302 may mainly include a program storage area and a data storage area, where: the program storage area may store an operating system, an application program that is required by at least one function, and the like; and the data storage area may store data (such as idle resource information) that is created according to processing performed by the user equipment 300, and the like. In addition, the memory 302 may include a high-speed RAM (random access memory), and may further include a non-volatile memory, for example, at least one magnetic disk storage component, a flash memory component, or another volatile solid-state storage component.

The processor 303 is a control center of the user equipment 300, and connects all parts of the user equipment 300 by using various interfaces and circuits. The processor 303 may be an integrated circuit chip, and have a signal processing capability. In an implementation process, the steps in the foregoing method may be performed by using an integrated logic circuit of hardware in the processor 303 or an instruction in a form of software. The instruction may be implemented and controlled by the processor 303, and the instruction is used to execute the method disclosed in an embodiment of the present invention. The foregoing processor 303 may further be a general purpose processor, a digital signal processor DSP), an application-specific integrated circuit, a field programmable gate array (FPGA), or another programmable logical device, discrete gate or transistor logical device, or discrete hardware component.

Specifically, by running or executing the software program and the application module that are stored in the memory 302, and invoking data that is stored in the memory 302, the processor 303 executes the following operations:

monitoring idle resources so as to obtain a first idle resource set;

claiming, in a first cycle, to use a first resource, where the first resource is a resource in the first idle resource set;

determining whether the first resource exists in a first claimed resource set, where the first claimed resource set is a set of resources that are claimed to be used by another user equipment except the first user equipment; and if the first resource exists in the first claimed resource set, claiming, in a second cycle, to use a second resource, where the second resource is a resource, in the first idle resource set, that is different from the first resource, and the second cycle is a cycle following the first cycle; or reclaiming a resource after at least one cycle following the first cycle; or if the first resource does not exist in the first claimed resource set, using, in a second cycle, the first resource to send data.

Further, the processor 303 is further configured to execute the following operation: before the determining whether the first resource exists in a first claimed resource set, determining the resources that are claimed, in the first cycle, to be used by the another user equipment except the first user equipment, so as to obtain the first claimed resource set.

Further, the processor 303 is further configured to execute the following operations: if the first resource exists in the first claimed resource set, selecting the second resource from the first idle resource set according to the first idle resource set and the first claimed resource set, and claiming, in the second cycle, to use the second resource.

Optionally, the processor 303 is further configured to execute the following operation: selecting a resource from A−(A∩B) as the second resource, where A indicates the first idle resource set, and B indicates the first claimed resource set.

Optionally, the processor 303 is further configured to execute the following operations: collecting, in the first claimed resource set, statistics about claim information of each resource, where the claim information includes one or more of: a quantity of claim times of each resource, a quantity of claiming user equipment of each resource, or a signal power of the claiming user equipment of each resource, or interference of the claiming user equipment of each resource; and selecting the second resource from the first idle resource set according to the claim information of each resource.

Further, the processor 303 is further configured to execute the following operations: selecting, from the first idle resource set, a resource with the smallest quantity of claim times as the second resource; or using a resource that is in the first idle resource set and that is corresponding to the smallest quantity of the user equipment as the second resource; or using a resource with the lowest signal power in the first idle resource set as the second resource; or using a resource with the weakest signal interference in the first idle resource set as the second resource.

Further, the processor 303 is further configured to execute the following operations: after at least one cycle following the first cycle, selecting a third resource from the first idle resource set, and claiming to use the third resource; or after at least one cycle following the first cycle, re-monitoring the idle resources so as to obtain a second idle resource set, selecting a third resource from the second idle resource set, and claiming to use the third resource.

Optionally, the processor 303 is further configured to execute the following operations: collecting, in the first claimed resource set, statistics about a quantity C of user equipment that claims the first resource; and generating a random number r in a range of [1,C], and after r cycles following the first cycle, reclaiming a resource.

Optionally, the processor 303 is further configured to execute the following operations: before the claiming, in a first cycle, to use a first resource, selecting a resource from A−(A∩B) as the first resource, where A indicates the first idle resource set, and B indicates the first claimed resource set; or before the claiming, in a first cycle, to use a first resource, randomly selecting a resource from the first idle resource set as the first resource; or before the claiming, in a first cycle, to use a first resource, selecting the first resource from the first idle resource set according to the claim information of each resource in the first claimed resource set, where the claim information includes the one or more of: a quantity of claim times of each resource, a quantity of claiming user equipment of each resource, or a signal power of the claiming user equipment of each resource, or interference of the claiming user equipment of each resource.

In this embodiment of the present invention, a relationship between idle resources (a first idle resource set) that are detected by a UE and idle resources (a first claimed resource set) that are claimed by another device is determined. When a resource that is claimed by first user equipment conflicts with a resource that is claimed by another UE, according to the first idle resource set (an idle resource set that is detected by the first user equipment) and the first claimed resource set (resources that are claimed, in a first cycle, to be used by another user equipment except the first user equipment), the first user equipment selects, after at least one cycle at random, to participate in resource contention again. In this way, a conflict backoff is performed on a claimed resource, which reduces a probability of a conflict between UEs when a UE obtains a resource and a delay of obtaining a resource by the UE, and enhances system resource utilization.

Embodiment 4

Figure 5:
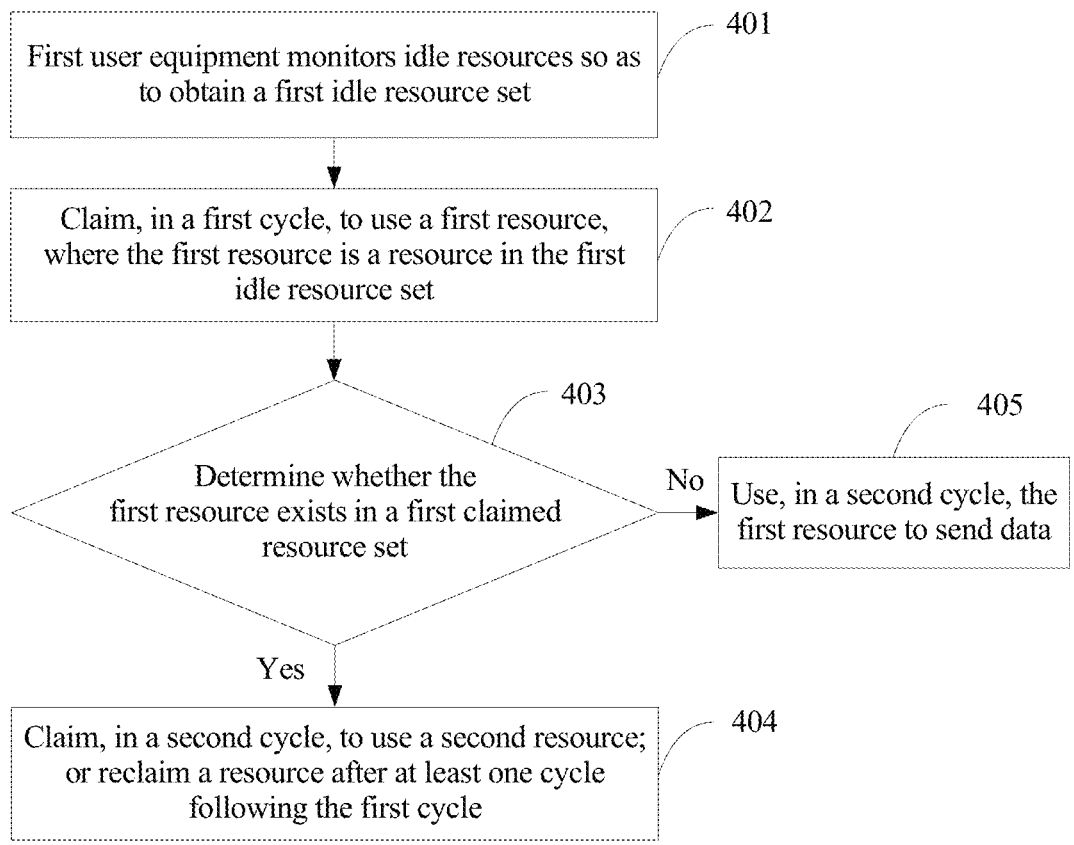
FIG. 5 is a flowchart of a resource reuse method according to Embodiment 4 of the present invention.

An embodiment provides a resource reuse method, where the method may be executed by first user equipment, and the first user equipment may be a D2D device. As shown in FIG. 5, the method includes:

Step 401: First user equipment monitors idle resources so as to obtain a first idle resource set.

Specifically, if user equipment wants to obtain a resource, the user equipment needs to monitor the resource; during a process of monitoring, signal energy detection is mainly performed, and whether a time-frequency energy block is an available idle resource is determined according to whether a signal energy level exceeds a certain threshold; the first user equipment may use a carrier sense multiple access ("CSMA" for short) technology to monitor and access an idle resource.

Figure 6:
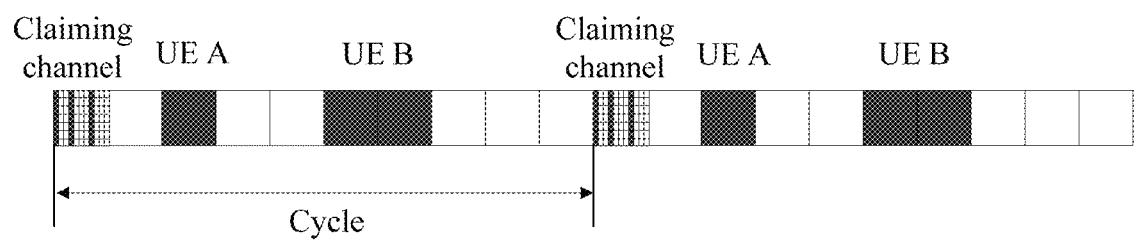
FIG. 6 is a schematic diagram of claiming, by a UE, a resource on a claiming channel in a predefined cycle according to Embodiment 4 of the present invention.

It should be noted that step 401 may be executed once in each cycle, or may be executed once at an interval of multiple cycles. This cycle is a predefined cycle. As shown in FIG. 6, each cycle includes multiple time-frequency resources, and each time-frequency resource has an ID. Some of the time-frequency resources are claiming channels, where a claiming channel is used by each D2D device for claiming a resource that is to be used. The claiming channel includes at least one time-frequency resource block, from which multiple UEs randomly select a resource for claim, and content of the claim includes an ID of a time-frequency resource block that is to be used. Optionally, the content of the claim may further include an ID of the claiming UE. Time-frequency resources except the claiming channel in each cycle are used by each D2D device to send data.

Step 402: Claim, in a first cycle, to use a first resource, where the first resource is a resource in the first idle resource set.

Step 403: Determine whether the first resource exists in a first claimed resource set, where the first claimed resource set is a set of resources that are claimed to be used by another user equipment except the first user equipment; and if the first resource exists in the first claimed resource set, execute step 404; or if the first resource does not exist in the first claimed resource set, execute step 405.

Step 404: Claim, in a second cycle, to use a second resource, where the second resource is a resource, in the first idle resource set, that is different from the first resource, and the second cycle is a cycle following the first cycle; or reclaim a resource after at least one cycle following the first cycle.

Specifically, the second resource may be any one of resources that are selected from the first idle resource set and that are different from the first resource, or may be a resource that is determined according to the first idle resource set and the first claimed resource set and that is different from the first resource (refer to Embodiments 5 and 6).

Step 405: Use, in a second cycle, the first resource to send data.

The first user equipment may use, in several consecutive cycles from the second cycle, the first resource to send data, and in this case, another user equipment detects that the first resource is in an occupied (non-idle) state; when the first user equipment stops sending data in a certain cycle, the first resource is released back to a resource pool.

In this embodiment of the present invention, a relationship between idle resources (a first idle resource set) that are detected by a UE and idle resources (a first claimed resource set) that are claimed by another device is determined. When a resource that is claimed by first user equipment conflicts with a resource that is claimed by another UE, the first user equipment selects another resource from the first idle resource set (an idle resource set that is detected by the first user equipment) for claiming, or reclaims a resource after an interval of at least one cycle. In this way, a conflict backoff is performed, which reduces a probability of a conflict between UEs when a UE obtains a resource and a delay of obtaining a resource by the UE, and enhances system resource utilization.

Embodiment 5

Figure 7:
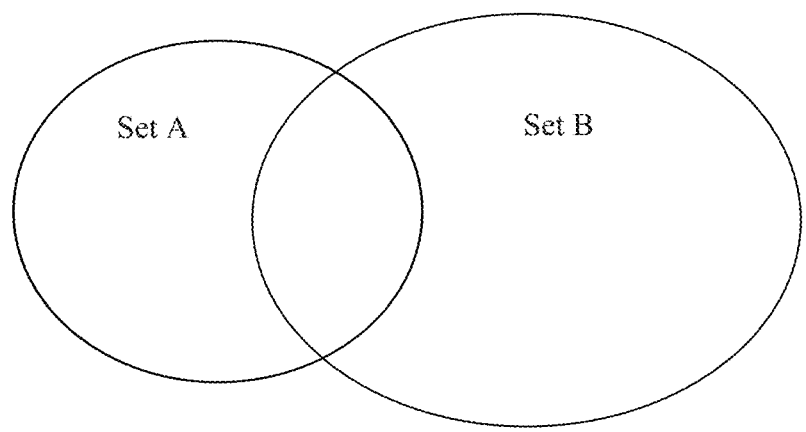
FIG. 7 is diagram of a relationship between resource sets in a case in which there are fewer UEs and more resources according to Embodiment 4 of the present invention.
Figure 8:
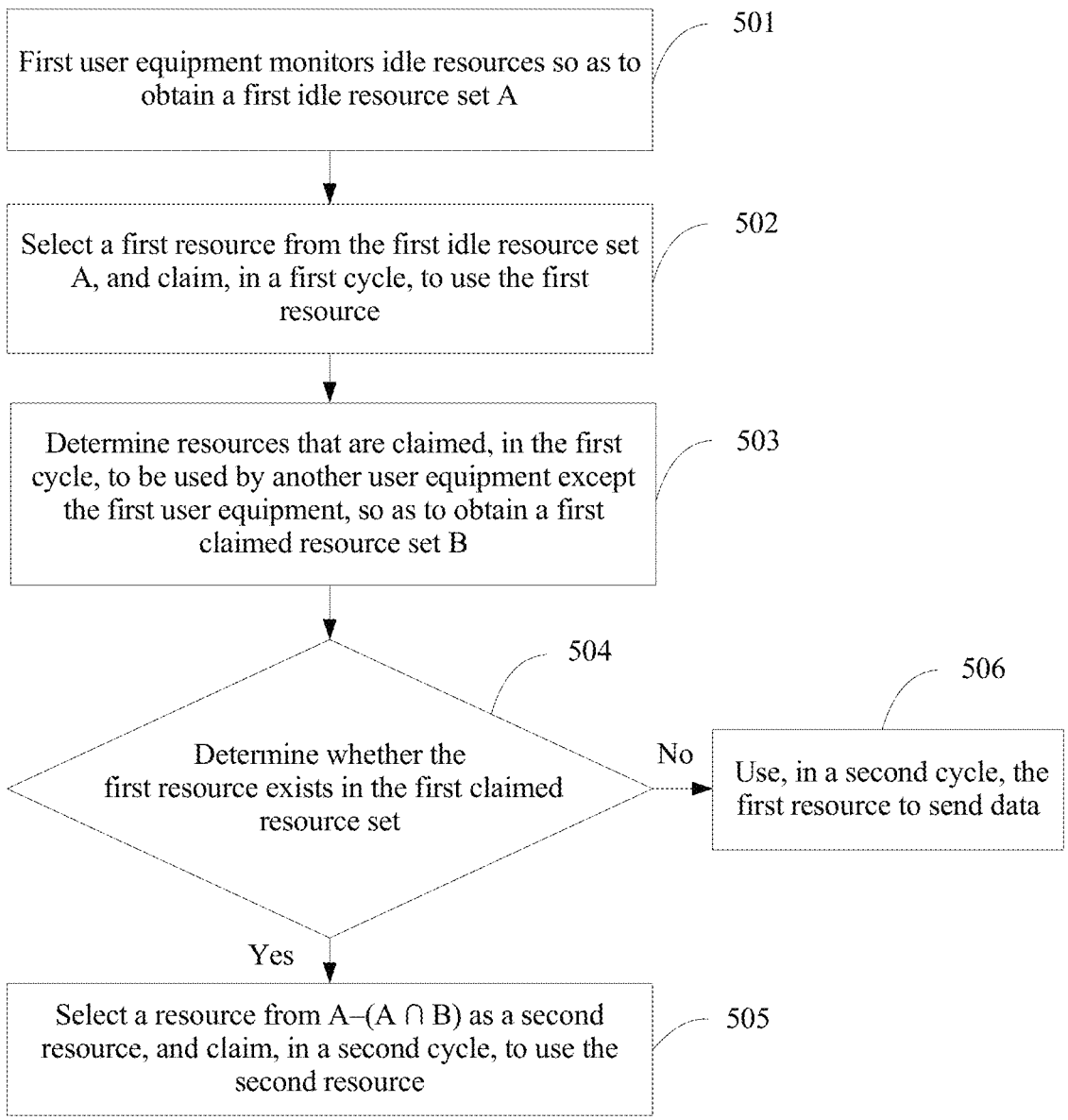
FIG. 8 is a flowchart of a resource reuse method according to Embodiment 5 of the present invention.

An embodiment provides a resource reuse method, where the method is executed by first user equipment, and the first user equipment may be a D2D device. This method particularly applies to a case in which there are fewer UEs and more resources. As shown in FIG. 7, a resource that does not belong to a claimed resource set B exists in an idle resource set A. As shown in FIG. 8, the method includes:

Step 501: First user equipment monitors idle resources so as to obtain a first idle resource set A.

Specifically, the first user equipment may use a CSMA technology to monitor an idle resource.

It should be noted that step 501 may be executed once in each cycle, or may be executed at an interval of multiple cycles. An idle resource set that is obtained by means of re-monitoring after an interval of multiple cycles is a new idle resource set, and an idle resource in the new idle resource set has higher real-timeness.

Step 502: Select a resource from the first idle resource set A as a first resource, and claim, in a first cycle, to use the first resource.

Specifically, the selecting a first resource in step 502 may be implemented in the following manners:

Manner 1: A resource from A−(A∩B) is selected as the first resource, where A indicates a first idle resource set, and B indicates a first claimed resource set. In this manner, step 503 is executed prior to step 502.

Manner 2: A resource is randomly selected from the first idle resource set as the first resource. In this manner, step 502 is executed prior to step 503.

In an implementation process, Manner 2 is similar to the prior art, in which a resource is randomly selected for claiming without performing a resource selection, and there is a certain chance that an idle resource that can be used is directly obtained. Compared with Manner 1, Manner 2 may save time. However, when Manner 2 is used, a probability of a conflict between a resource that is selected by UE and a resource that is selected by another device is relatively high, and multiple cycles may be required by the UE to contend for an available resource. When there are fewer UEs and more resources, a probability of directly obtaining an available resource in Manner 1 is relatively high.

Step 503: Determine resources that are claimed, in the first cycle, to be used by another user equipment except the first user equipment, so as to obtain a first claimed resource set B.

That is, the first claimed resource set B is a set of resources that are claimed to be used by the another user equipment except the first user equipment.

It should be noted that step 503 is an optional step. Alternatively, another device may determine a first claimed resource set B, and then send the first claimed resource set B to the first user equipment.

Step 504: Determine whether the first resource exists in the first claimed resource set B. If the first resource exists in the first claimed resource set, execute step 505; or if the first resource does not exist in the first claimed resource set, execute step 506.

Specifically, in a same cycle, there may be multiple UEs contending for an idle resource at the same time, and the first user equipment needs to determine a resource that is claimed to be used by another UE so as to perform a comparison. If a same resource is claimed by multiple UEs, each of the multiple UEs disclaims this resource, and contends again in a next cycle.

Step 505: Select, according to the first idle resource set A and the first claimed resource set B, a second resource from the first idle resource set A, and claim, in a second cycle, to use the second resource.

In this embodiment, step 505 may include: selecting a resource from A−(A∩B) as a second resource, and claiming, in a second cycle, to use the second resource, where: A indicates the first idle resource set, and B indicates the first claimed resource set; the second resource is a resource that is different from the first resource, and the second cycle is a cycle following the first cycle.

Specifically, when the first resource exists in the first claimed resource set, it indicates that a resource that is claimed by another UE is the same as a resource that is claimed by the first user equipment. In this case, a contention conflict occurs, and the first user equipment needs to select, in a next cycle, a new idle resource for claiming. To reduce a conflict probability, in this embodiment, a selection is performed on a to-be-claimed resource, and a selection manner is selecting, from the first idle resource set, a resource that is not be claimed by another user equipment, and therefore a probability of obtaining an available idle resource in a next cycle is relatively high.

Step 506: Use, in a second cycle, the first resource to send data.

Specifically, when the first resource does not exist in the first claimed resource set, it indicates that the first resource that is selected by the first user equipment is not claimed by another user equipment, and the first user equipment may use, in several consecutive cycles from the second cycle, the first resource to send data. In this case, another user equipment detects that the first resource is in an occupied (non-idle) state; when the first user equipment stops sending data in a certain cycle, the first resource is released back to a resource pool.

In this embodiment of the present invention, a relationship between idle resources (a first idle resource set) that are detected by a UE and idle resources (a first claimed resource set) that are claimed by another device is determined. When a resource that is claimed by first user equipment conflicts with a resource that is claimed by another UE, according to the first idle resource set A (an idle resource set that is detected by the first user equipment) and the first claimed resource set B (resources that are claimed, in a first cycle, to be used by another user equipment except the first user equipment), a resource that is not claimed by another user equipment is selected for claiming, and a selection of a to-be-claimed resource is performed, which reduces a probability of a conflict between UEs when a UE obtains a resource and a delay of obtaining a resource by the UE, and enhances system resource utilization.

Embodiment 6

Figure 9:
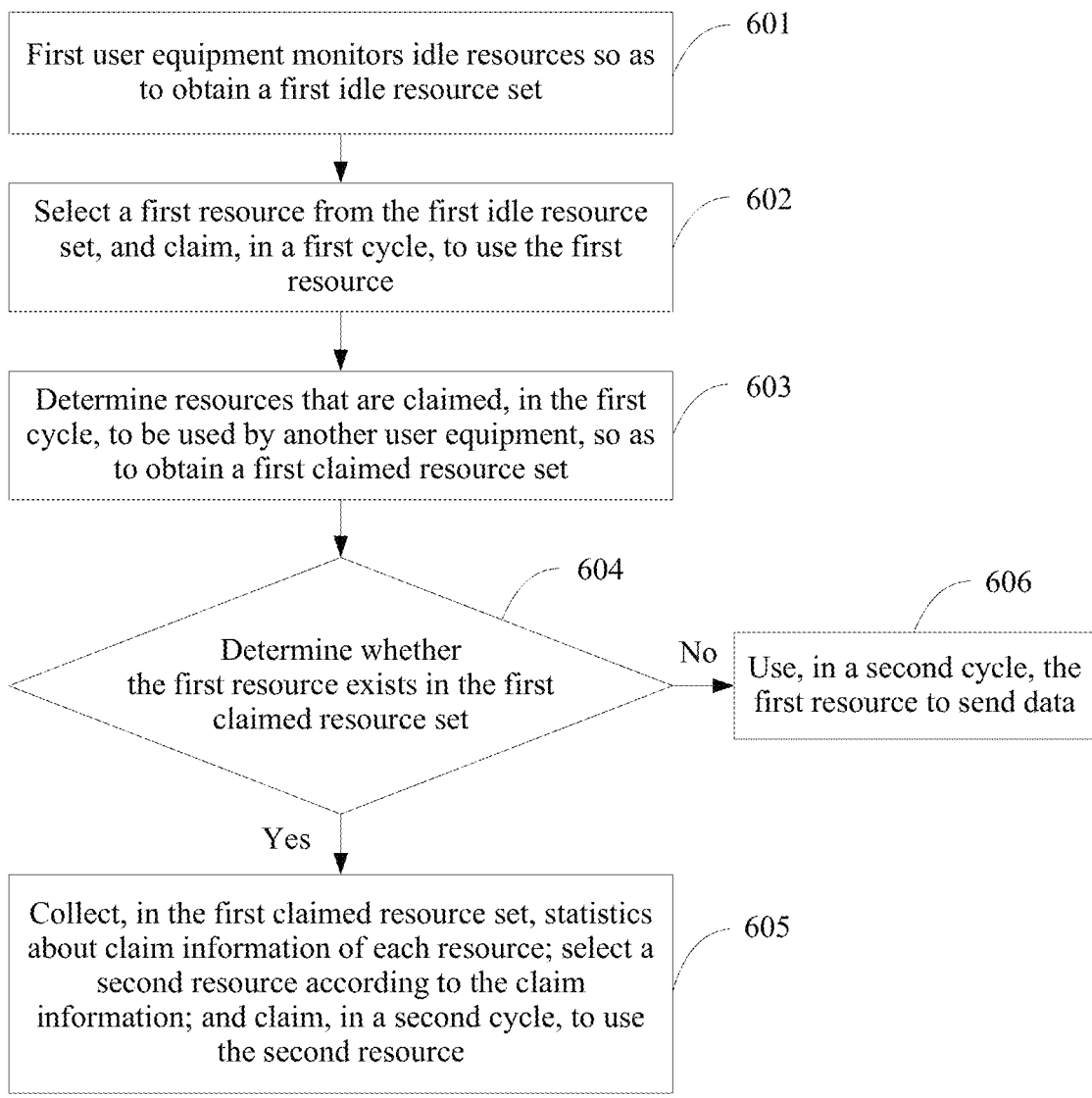
FIG. 9 is a flowchart of a resource reuse method according to Embodiment 6 of the present invention.

As shown in FIG. 9, an embodiment provides a resource reuse method, where the method is executed by first user equipment, and the first user equipment may be a D2D device. In this method, a resource is further selected, according to claim information of each idle resource, for claiming. This method particularly applies to a case in which there are more UEs and fewer resources, for example, when a set A−(A∩B) is empty, and the method includes:

Step 601: First user equipment monitors idle resources so as to obtain a first idle resource set.

Specifically, if a UE wants to obtain a resource, the UE needs to monitor the resource; during a process of monitoring, signal energy detection is mainly performed, and whether a time-frequency energy block is an available resource is determined according to a signal energy level; the first user equipment may use a CSMA technology to monitor an idle resource.

It should be noted that step 601 may be executed once in each cycle, or may be executed at an interval of multiple cycles. An idle resource set that is obtained by means of re-monitoring after an interval of multiple cycles is a new idle resource set, and an idle resource in the new idle resource set has higher real-timeness.

Step 602: Select a first resource from the first idle resource set, and claim, in a first cycle, to use the first resource.

Specifically, the selecting a first resource in step 602 may be implemented in the following manners:

Manner 1: Statistics about claim information of each resource is collected in the first claimed resource set B, where the claim information includes one or more of: a quantity of claim times of each resource, a quantity of claiming user equipment of each resource, or a signal power of the claiming user equipment of each resource, or interference of the claiming user equipment of each resource; and the first resource is selected from the first idle resource set according to the claim information of each resource.

Further, the selecting the first resource from the first idle resource set according to the claim information of each resource includes: selecting, from the first idle resource set, a resource with the smallest quantity of claim times as the first resource; or selecting, from the first idle resource set, a resource that is corresponding to the smallest quantity of the user equipment as the first resource; or selecting, from the first idle resource set, a resource with the lowest signal power as the first resource, such as an RSRP (reference signal receive power) that is obtained by performing simple energy detection to detect a reference signal (RS); or selecting, from the first idle resource set, a resource with the weakest signal interference of being claimed as the first resource, such as an interference intensity that is obtained by detecting the reference signal (RS). In this manner, step 603 is executed prior to step 602.

Manner 2: A resource is randomly selected from the first idle resource set as the first resource. In this manner, step 602 is executed prior to step 603.

In an implementation process, Manner 2 is similar to the prior art, in which a resource is randomly selected for claiming without performing a resource selection, and there is a certain chance that an idle resource that can be used is directly obtained. Compared with Manner 1, Manner 2 may save time. However, this embodiment applies to a case in which there are more UEs and fewer resources, and resources that are claimed in the first cycle by each UE are all in conflict with resources in the first idle resource set; a probability of obtaining an available resource in Manner 2 is extremely low; in Manner 1, a selection is performed on each idle resource, and an optimal resource is selected, according to claim information, for claiming, so that a probability of obtaining an available resource is relatively high.

Step 603: Determine resources that are claimed, in the first cycle, to be used by another user equipment except the first user equipment, so as to obtain a first claimed resource set.

That is, the first claimed resource set is a set of resources that are claimed to be used by the another user equipment except the first user equipment.

It should be noted that step 603 is an optional step. Alternatively, another device may determine a first claimed resource set, and then send the first claimed resource set to the first user equipment.

Step 604: Determine whether the first resource exists in the first claimed resource set. If the first resource exists in the first claimed resource set, execute step 605; or if the first resource does not exist in the first claimed resource set, execute step 606.

Specifically, in a same cycle, there may be multiple UEs contending for an idle resource at the same time, and the first user equipment needs to determine a resource that is claimed to be used by another UE so as to perform a comparison. If a same resource is claimed by multiple UEs, each of the multiple UEs disclaims this resource, and contends again in a next cycle.

Step 605: Select, according to the first idle resource set A and the first claimed resource set B, a second resource from the first idle resource set A, and claim, in a second cycle, to use the second resource.

In this embodiment, step 605 may include: collecting, in the first claimed resource set, statistics about claim information of each resource, where the claim information includes one or more of: a quantity of claim times of each resource, a quantity of claiming user equipment of each resource, or a signal power of the claiming user equipment of each resource, or interference of the claiming user equipment of each resource; selecting a second resource from the first idle resource set according to the claim information of each resource; and claiming, in a second cycle, to use the second resources, where the second resource is a resource that is different from the first resource, and the second cycle is a cycle following the first cycle.

Further, when the claim information includes multiple types of information, the second resource may be selected by successively using the multiple types of information according to a predetermined sequence. For example, it is assumed that the claim information includes the quantity of claim times of each resource, the quantity of claiming user equipment of each resource, the signal power and the signal interference of the claiming user equipment of each resource; the quantity of claim times of each resource may be first compared according to the sequence, and a resource with the smallest quantity of claim times is selected; if the quantity of times is the same, the quantity of claiming user equipment of each resource may further be compared, and a resource that is claimed by a smallest quantity of user equipment is selected; if the quantity of claiming user equipment of each resource is the same, the signal power of the claiming user equipment of each resource may further be compared, and a resource that is claimed by user equipment whose signal power is relatively weak is selected; if the signal power of the claiming user equipment of each resource is the same, finally, the signal interference of the claiming user equipment of each resource may further be compared, and a resource that is claimed by user equipment whose signal interference is relatively weak is selected.

Specifically, when the first resource exists in the first claimed resource set, it indicates that a resource that is claimed by another UE is the same as a resource that is claimed by the first user equipment. In this case, a contention conflict occurs, and the first user equipment needs to select, in a next cycle, a new idle resource for claiming. To reduce a conflict probability, in this embodiment, a selection is performed on a to-be-claimed resource, and a selection manner is selecting, from the first idle resource set, an optimal resource is selected, according to claim information, for claiming, and therefore a probability of obtaining an available idle resource in a next cycle is relatively high.

Step 606: Use, in a second cycle, the first resource to send data.

Specifically, when the first resource does not exist in the first claimed resource set, it indicates that the first resource that is selected by the first user equipment is not claimed by another user equipment, and the first user equipment may use, in several consecutive cycles from the second cycle, the first resource to send data. In this case, another user equipment detects that the first resource is in an occupied (non-idle) state; when the first user equipment stops sending data in a certain cycle, the first resource is released back to a resource pool.

In this embodiment of the present invention, a relationship between idle resources (a first idle resource set) that are detected by a UE and idle resources (a first claimed resource set) that are claimed by another device is determined. When a resource that is claimed by first user equipment conflicts with a resource that is claimed by another UE, according to the first idle resource set (an idle resource set that is detected by the first user equipment) and the first claimed resource set (resources that are claimed, in a first cycle, to be used by another user equipment except the first user equipment), claim information of an idle resource that is monitored and obtained by the first user equipment is collected, an optimal resource is selected, according to claim information, for claiming, and a selection of a to-be-claimed resource is performed, which reduces a probability of a conflict between UEs when a UE obtains a resource and a delay of obtaining a resource by the UE, and enhances system resource utilization.

Embodiment 7

Figure 10:
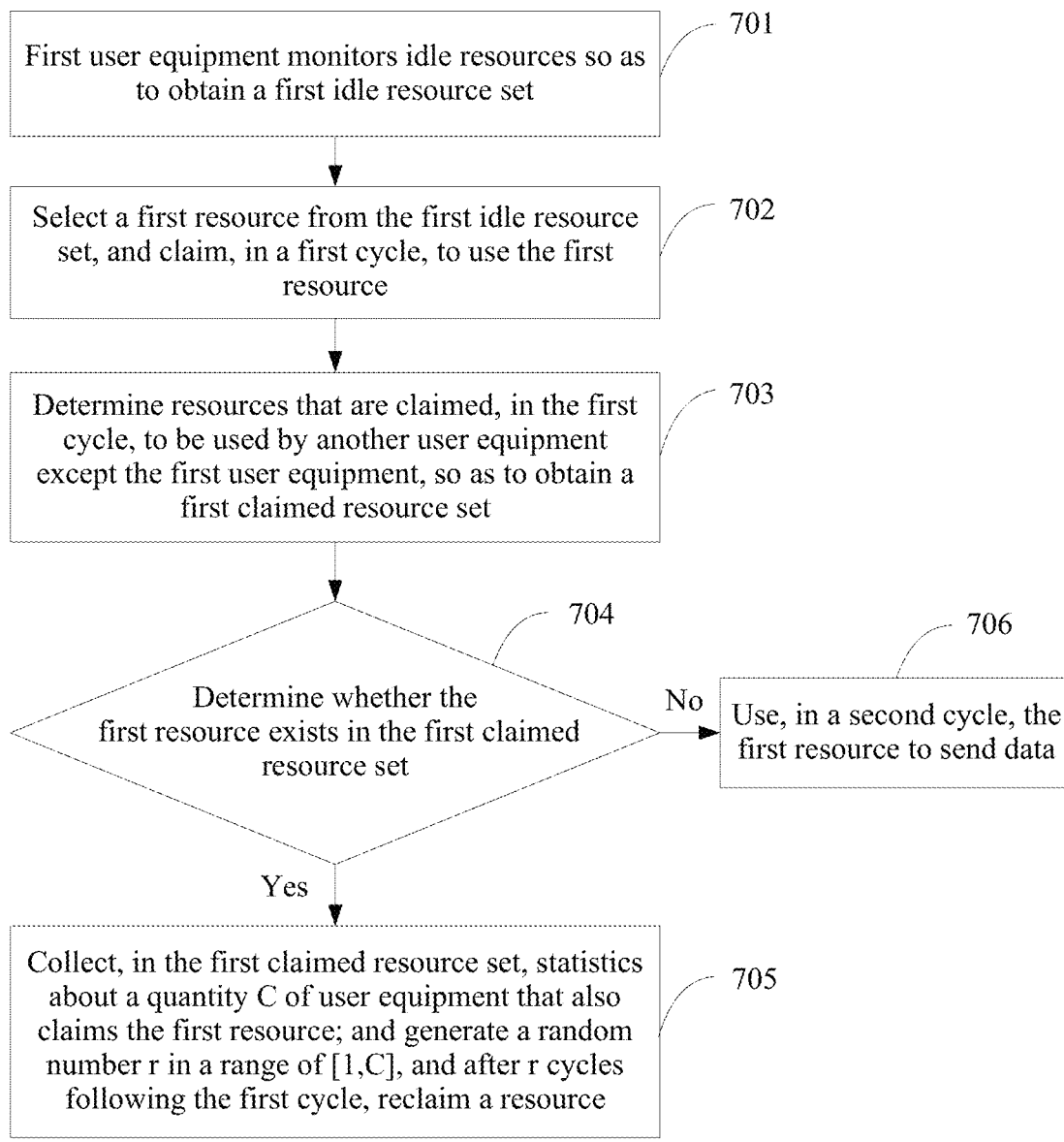
FIG. 10 is a flowchart of a resource reuse method according to Embodiment 7 of the present invention.

As shown in FIG. 10, an embodiment provides a resource reuse method, where the method is executed by first user equipment, and the first user equipment may be a D2D device. In this method, a backoff is performed after a contention conflict occurs, and a resource is reclaimed after an interval of several cycles at random. This method particularly applies to a case in which there are more UEs and fewer resources, for example, when a set A−(A∩B) is empty, and the method includes:

Step 701: First user equipment monitors idle resources so as to obtain a first idle resource set.

Specifically, if a UE wants to obtain a resource, the UE needs to monitor the resource; during a process of monitoring, signal energy detection is mainly performed, and whether a time-frequency energy block is an available resource is determined according to a signal energy level; the first user equipment may use a CSMA technology to monitor an idle resource.

It should be noted that step 701 may be executed once in each cycle, or may be executed at an interval of multiple cycles. An idle resource set that is obtained by means of re-monitoring after an interval of multiple cycles is a new idle resource set, and an idle resource in the new idle resource set has higher real-timeness.

Step 702: Select a first resource from the first idle resource set, and claim, in a first cycle, to use the first resource.

Step 703: Determine resources that are claimed, in the first cycle, to be used by another user equipment except the first user equipment, so as to obtain a first claimed resource set.

That is, the first claimed resource set is a set of resources that are claimed to be used by the another user equipment except the first user equipment.

It should be noted that step 703 is an optional step. Alternatively, another device may determine a first claimed resource set, and then send the first claimed resource set to the first user equipment.

Step 704: Determine whether the first resource exists in the first claimed resource set, where the first resource is a resource that is claimed, in the first cycle, to be used by the first user equipment. If the first resource exists in the first claimed resource set, execute step 705; or if the first resource does not exist in the first claimed resource set, execute step 706.

Specifically, in a same cycle, there may be multiple UEs contending for an idle resource at the same time, and the first user equipment needs to determine a resource that is claimed to be used by another UE so as to perform a comparison. If a same resource is claimed by multiple UEs, each of the multiple UEs disclaims this resource, and contends again in a next cycle.

Step 705: After at least one cycle following the first cycle, reclaim a resource.

Specifically, a resource may be reclaimed in two manners: First, a third resource is selected from the first idle resource set and claimed to be used; second, idle resources are re-monitored so as to obtain a second idle resource set, and a third resource is selected from the second idle resource set and claimed to be used. Manner 1 means that after several cycles are avoided, a new resource is selected, from the first idle resource set, for claiming, where the resource claimed is detected several cycles ago; Manner 2 indicates that, after several cycles are avoided, idle resources are re-monitored, and a real-time update is performed on an idle resource set. In this case, a resource in the idle resource set may not still be the resource that is originally in the first idle resource set.

In this embodiment, step 705 may include: collecting, in the first claimed resource set, statistics about a quantity C of user equipment that also claims the first resource; and generating a random number r in a range of [1,C], and after r cycles following the first cycle, reclaiming a resource.

Specifically, when the first resource exists in the first claimed resource set, it indicates that a resource that is claimed by another UE is the same as a resource that is claimed by the first user equipment, and in this case, a contention conflict occurs. To reduce a conflict probability, in this embodiment, a conflict backoff is performed, which is specifically avoiding r contention cycles; in step 705, if a large quantity of user equipment claims a resource that is the same as a resource claimed by the first user equipment, that is, a case in which C is relatively large, it indicates that the quantity of UE is relatively large, contention is intense, and r may be randomized to a larger value with a relatively high probability; therefore, the first user equipment stops claiming a resource in more contention cycles and temporarily withdraws from the contention for a resource.

Step 706: Use, in a second cycle, the first resource to send data.

Specifically, when the first resource does not exist in the first claimed resource set, it indicates that the first resource that is selected by the first user equipment is not claimed by another user equipment, and the first user equipment may use, in several consecutive cycles from the second cycle, the first resource to send data. In this case, another user equipment detects that the first resource is in an occupied (non-idle) state; when the first user equipment stops sending data in a certain cycle, the first resource is released back to a resource pool.

In the resource reuse method provided in the embodiments of the present invention, before the claiming, in a first cycle, to use a first resource, a manner for selecting the first resource includes: selecting a resource from A−(A∩B) as the first resource, where A indicates a first idle resource set, and B indicates the first claimed resource set; or randomly selecting a resource from the first idle resource set as the first resource; or selecting the first resource from the first idle resource set according to claim information of each resource, where the claim information includes one or more of: a quantity of claim times of each resource, a quantity of claiming user equipment of each resource, or a signal power of the claiming user equipment of each resource, or interference of the claiming user equipment of each resource. It can be easily learned that, in the resource reuse method provided in the foregoing embodiments, the three manners for selecting a resource from the first idle resource set for claiming in different cycles may be combined, and therefore a purpose of the present invention may still be achieved, and the foregoing embodiments cannot be regarded as a limitation on the present invention.

In the embodiments of the present invention, a relationship between idle resources (a first idle resource set) that are detected by a UE and idle resources (a first claimed resource set) that are claimed by another device is determined. When a resource that is claimed by first user equipment conflicts with a resource that is claimed by another UE, according to the first idle resource set (an idle resource set that is detected by the first user equipment) and the first claimed resource set (resources that are claimed, in a first cycle, to be used by another user equipment except the first user equipment), the first user equipment selects, after at least one cycle at random, to participate in resource contention again. In this way, a conflict backoff is performed on a claimed resource, which reduces a probability of a conflict between UEs when a UE obtains a resource and a delay of obtaining a resource by the UE, and enhances system resource utilization.

It should be noted that, when a resource reuse apparatus provided in the foregoing embodiment contends for a resource, division of the foregoing function modules is merely used as an example for illustration. In actual application, the foregoing functions may be allocated to different function modules and implemented according to a requirement, that is, an inner structure of the apparatus is divided into different function modules to implement all or a part of the functions described above. In addition, the resource reuse apparatus provided in the foregoing embodiments pertains to the same concept as the resource reuse method embodiments. For a specific implementation process, refer to the method embodiments, and details are not described herein.

The sequence numbers of the foregoing embodiments of the present invention are merely for illustrative purposes, and are not intended to indicate priorities of the embodiments.

A person of ordinary skill in the art may understand that all or some of the steps of the embodiments may be implemented by hardware or a program instructing related hardware. The program may be stored in a computer-readable storage medium. The storage medium may include: a read-only memory, a magnetic disk, or an optical disc.

The foregoing descriptions are merely exemplary embodiments of the present invention, but are not intended to limit the present invention. Any modification, equivalent replacement, and improvement made without departing from the spirit and principle of the present invention shall fall within the protection scope of the present invention.

What is claimed is:

1. User equipment, comprising:
   a transmitter configured to send data;
   a memory configured to store an instruction and data; and
   a processor configured to:
   monitor idle resources to obtain a first idle resource set;
   determine resources claimed, in a first cycle, to be used by another user equipment except the user equipment, to obtain a first claimed resource set, wherein the first claimed resource set is a set of resources that are claimed to be used by another user equipment except the user equipment; and
   determine whether a first resource exists in the first claimed resource set, wherein the first resource is a resource in the first idle resource set;
   when the first resource does not exist in the first claimed resource set, the transmitter use the first resource to send data in a second cycle.

2. The user equipment according to claim 1, wherein the processor is further configured to:
   select a new resource and claim the new resource after at least one cycle following the first cycle, when the first resource exists in the first claimed resource set.

3. The user equipment according to claim 2, wherein the processor is further configured to:
   select a resource from A−(A∩B) as the new resource, wherein A indicates the first idle resource set, and B indicates the first claimed resource set.

4. The user equipment according to claim 1, wherein the processor is further configured to:
   claim, in a first cycle, to use a first resource, wherein the first resource is a resource in the first idle resource set.

5. The user equipment according to claim 1, wherein the processor is further configured to:
   select a resource from A−(A∩B) as the first resource, wherein A indicates the first idle resource set, and B indicates the first claimed resource set.

6. The user equipment according to claim 1, wherein the processor is further configured to:
   collect, in the first claimed resource set, statistics about a quantity C of user equipment that claims the first resource; and
   generate a random number r in a range of [1,C], and after an interval of r cycles following the first cycle, claim a new resource.

7. The user equipment according to claim 1, wherein the processor is further configured to:
   select a third resource from the first idle resource set, and claim to use the third resource; or
   re-monitor idle resources so as to obtain a second idle resource set; and select a third resource from the second idle resource set, and claiming to use the third resource.

8. A resource reuse method, comprising:
monitoring, by first user equipment, idle resources to obtain a first idle resource set;
determining resources claimed, in a first cycle, to be used by another user equipment except the first user equipment, so as to obtain the first claimed resource set, wherein the first claimed resource set is a set of resources that are claimed to be used by another user equipment except the first user equipment;
determining whether a first resource exists in the first claimed resource set, wherein the first resource is a resource in the first idle resource set; and
when the first resource does not exist in the first claimed resource set, using, in a second cycle, the first resource to send data.

9. The method according to claim 8, further comprising:
when the first resource exists in the first claimed resource set, selecting a new resource and claiming the new resource after at least one cycle following the first cycle.

10. The method according to claim 9, wherein the selecting a new resource comprises:
selecting a resource from A−(A∩B) as the new resource, wherein A indicates the first idle resource set, and B indicates the first claimed resource set.

11. The method according to claim 9, wherein the claiming the new resource after at least one cycle following the first cycle comprises:
collecting, in the first claimed resource set, statistics about a quantity C of user equipment that claims the first resource; and
generating a random number r in a range of [1,C], and after an interval of r cycles following the first cycle, claiming the new resource.

12. The method according to claim 9, wherein the selecting a new resource and claiming the new resource comprises:
selecting a third resource from the first idle resource set, and claiming to use the third resource; or
the selecting a new resource and claiming the new resource comprises:
re-monitoring idle resources so as to obtain a second idle resource set; and
selecting a third resource from the second idle resource set, and claiming to use the third resource.

13. The method according to claim 8, the method further comprising:
claiming, in a first cycle, to use a first resource, wherein the first resource is a resource in the first idle resource set.

14. The method according to claim 8, the method further comprising:
selecting a resource from A−(A∩B) as the first resource, wherein A indicates the first idle resource set, and B indicates the first claimed resource set.

15. A non-transitory computer-readable storage medium to store instructions which, when executed by a computer, cause the computer to execute:
monitoring, by first user equipment, idle resources so as to obtain a first idle resource set;
determining resources that are claimed, in a first cycle, to be used by another user equipment except the first user equipment, so as to obtain the first claimed resource set, wherein the first claimed resource set is a set of resources that are claimed to be used by another user equipment except the first user equipment;
determining whether a first resource exists in the first claimed resource set, wherein the first resource is a resource in the first idle resource set; and
if the first resource does not exist in the first claimed resource set, using, in a second cycle, the first resource to send data.

\* \* \* \* \*